April 3, 1951     S. ROHLIK     2,547,492

COMBINATION CAMERA CASE AND FILTER HOLDER

Filed Jan. 29, 1949

INVENTOR.
Sigmund Rohlik
BY Daniel G. Cullen
Attorney

Patented Apr. 3, 1951

2,547,492

UNITED STATES PATENT OFFICE 2,547,492

COMBINATION CAMERA CASE AND FILTER HOLDER

Sigmund Rohlik, Detroit, Mich.

Application January 29, 1949, Serial No. 73,499

1 Claim. (Cl. 150—52)

This application relates to camera case combinations and more particularly to a novel combination of a camera case and a filter holder characterized by the inclusion in the case of a display and holder pad for displaying in a convenient place filters for use with the lens of the camera.

For an understanding of the combination herein disclosed, reference should be had to the specification which follows and to the appended drawings.

Figure 1:
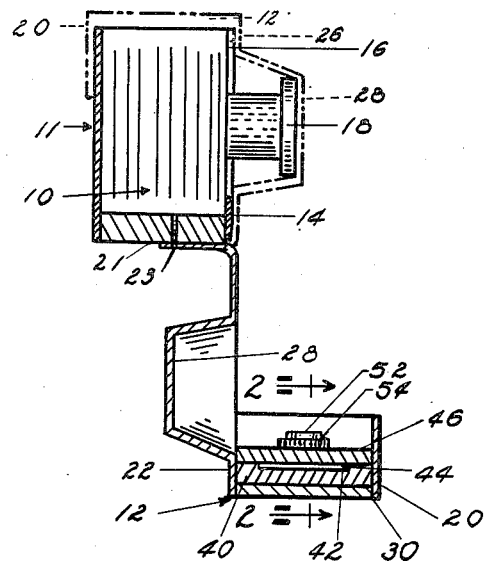
Fig. 1 is a transverse sectional view of a camera case showing a camera in place in the case and with a filter display cover of the camera arranged for display of filters.

Referring to the drawing it will be observed that it shows the combination of a camera 10, an everready case 11 for the camera, and a cover 12 for the case.

The case 11 contains the camera 10 and has a front wall 14 formed with an opening or cutout portion 16 exposing the lens 18 of the camera. Cover 12 has a marginal flange 20 and is hingedly connected to the bottom 21 of the case by a flap 22 secured to case 11 by stitching 23. When the cover is in the closed position, flap 22 forms a cover for the opening 16 in the front 14 of the case, to protect lens 18, with flap 29 having a socket portion 28 overlying the lens 18, all substantially as shown in dotted lines on Fig. 1.

However, as is shown in full lines in Fig. 1, the cover 12 may be swung down to occupy an open or display position, forward and below the case 11, with the marginal cover flange 20 above and surrounding the major portion 30 of the cover 12. Thus, the cover 12 may serve as an open display tray well below and in front of the lens 18 for displaying in a manner that will now be described a selection of filters for the lens 18.

Figure 2:
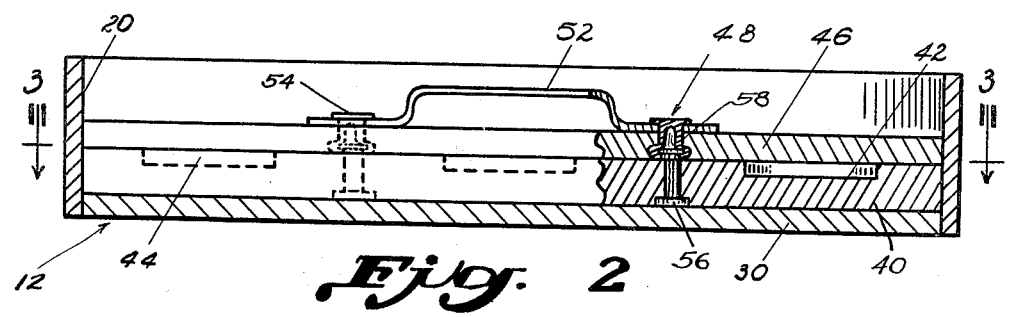
Fig. 2 is a longitudinal sectional view of the cover, as if on line 2—2 of Fig. 1.
Figure 3:
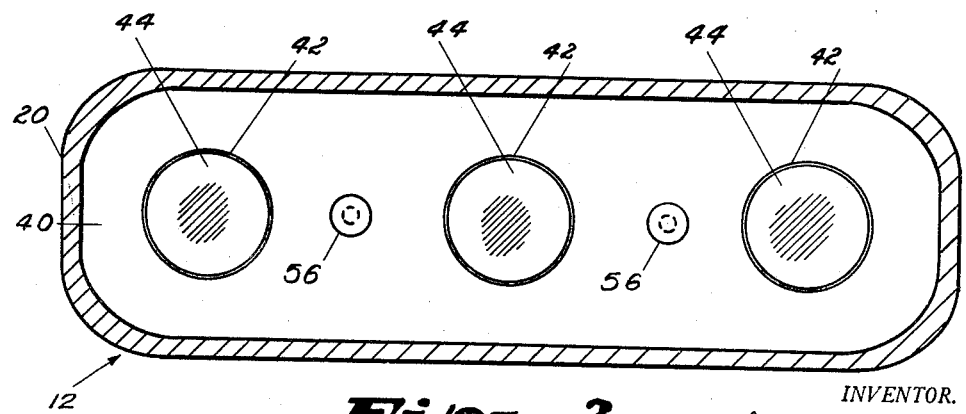
Fig. 3 is a plan sectional view as if on line 3—3 of Fig. 2.

Disposed within the cover, preferably glued to the portion 30 thereof, is a base pad 40 having large shallow circular sockets 42 in its upper surface receiving filters 44 for the camera lens, these being displayed on the base pad 40 for instant access for use when the cover is in the open position shown in Fig. 1 in full lines. For holding down the filters in the sockets 42 there is provided a filter hold down pad 46 removably secured to the base pad 40 to hold down the filters 44 in the sockets 42 of the base pad 40 by snap fasteners at 48 on the cooperating and engaging surfaces of the pads 40 and 46. The hold down pad 46 may be removed from the base pad 40 by the use of a strap 52 on the upper surface of the hold down pad, enabling the latter to be lifted up from the base pad 40. The strap 52 is secured to the hold down pad by rivet head portions 54 of the snap fasteners 48, as shown best in Fig. 2, so that the upward pull on the strap not only tends to lift the hold down pad from the base pad, but also to disconnect the snap fasteners at 48.

The latter, as indicated, include male elements 56 projecting upwardly from the base pad and female elements 58 in the under surface of the hold down pad 46. Since the lower face of the hold down pad is left smooth by the use of female fasteners in the hold down pad rather than male fasteners, there is no danger of metal portions on the under surface of the hold down pad scratching or striking the delicate surfaces of the filters, these being of glass or other optical material, it being observed that the pads 40 and 46 may be felt or cloth covered or velvet covered in order to prevent abrasion of the filters in the sockets 42 of the base pad 40.

It will readily be observed that when the cover 12 is in the display position shown in full lines in Fig. 1, the filters 44 are readily available but are protected until it is necessary to remove them from the base pad 40 by the hold down pad 46. Removal of the latter instantly exposes the several filters for display and for instant access for use and a filter may be removed from its socket 42 and applied to the lens and immediately thereafter the hold down pad 46 replaced to protect and hold down the unused filters.

Now having described the camera case combination herein disclosed, reference should be had to the claim which follows for an understanding of the scope of the invention being here protected.

I claim:

In a camera case including a body having an open front and an open top, a front covering flap hinged at one horizontal edge thereof to the body at the lower front horizontal edge of the body and formed to be swung forward and up to cover the front of the body or to be swung down to expose the front of the body, a marginally flanged top cover for the top of the body hingedly connected to the other horizontal edge of the flap whereby the top cover may occupy an open position forward and below the body, suspended from the bottom of the body by such flap, with the top cover marginal flange above and surrounding the rest of the top cover, whereby the top cover in such open position may serve as an open tray, well below and in front of the body, and whereby the top cover may occupy a position to cover the top of the body with the flap covering the front of the body, that improvement which consists of a base pad in said top cover having large shallow sockets in that surface thereof which is uppermost when the top cover is in such open position, and a hold down pad resting on said base pad and removably secured thereto by snap fasteners on the cooperating and engaging surfaces of the base pad and the hold down pad, said snap fasteners including male elements projecting upwardly from said base pad, and female elements in the under surface of the hold down pad, and a strap on the upper surface of the hold down pad enabling said hold down pad to be lifted up from the base pad, said strap being secured to said hold down pad by rivet head portions of said snap fasteners.

SIGMUND ROHLIK.

REFERENCES CITED

The following references are of record in the file of this patent:

UNITED STATES PATENTS

| Number | Name | Date |
| --- | --- | --- |
| 1,374,949 | Osgood | Apr. 19, 1921 |
| 2,136,357 | Darling et al. | Nov. 8, 1938 |
| 2,223,219 | Mayerovitz | Nov. 26, 1940 |
| 2,249,116 | Corless | July 15, 1941 |
| 2,290,307 | Wicker | July 21, 1942 |
| 2,323,053 | Kupferschmid | June 29, 1943 |
| 2,348,620 | Grover | May 9, 1944 |
| 2,478,267 | Hickler | Aug. 9, 1949 |
| 2,503,485 | Hill | Apr. 11, 1950 |